US009873633B2

(12) United States Patent
Pallotta et al.

(10) Patent No.: US 9,873,633 B2
(45) Date of Patent: Jan. 23, 2018

(54) HEAT TREATABLE COATED ARTICLE WITH LOW-E COATING HAVING ZINC STANNATE BASED LAYER BETWEEN IR REFLECTING LAYERS AND CORRESPONDING METHOD

(71) Applicant: Centre Luxembourgeois de Recherches pour le Verre et la Ceramique (C.R.V.C.) SaRL, Dudelange (LU)

(72) Inventors: Pierre Pallotta, Villerupt (FR); Jose Ferreira, Rumelange (LU); Herbert Lage, Luxembourg (LU); Marcus Frank, Gelnhausen (DE)

(73) Assignee: Guardian Europe S.a.r.l., Bertrange (LU)

( * ) Notice: Subject to any disclaimer, the term of this patent is extended or adjusted under 35 U.S.C. 154(b) by 254 days.

(21) Appl. No.: 14/084,895

(22) Filed: Nov. 20, 2013

(65) Prior Publication Data
US 2015/0140354 A1 May 21, 2015

(51) Int. Cl.
| B32B 15/04 | (2006.01) |
| B32B 17/06 | (2006.01) |
| C03C 17/36 | (2006.01) |
| C03B 27/00 | (2006.01) |

(52) U.S. Cl.
CPC ............ *C03C 17/366* (2013.01); *C03B 27/00* (2013.01); *C03C 17/3626* (2013.01); *C03C 17/3639* (2013.01); *C03C 17/3644* (2013.01); *C03C 17/3652* (2013.01); *Y10T 428/12549* (2015.01); *Y10T 428/2495* (2015.01); *Y10T 428/265* (2015.01)

(58) Field of Classification Search
USPC ....... 428/426, 432, 433, 434, 688, 689, 697, 428/699, 701, 702
See application file for complete search history.

(56) References Cited

U.S. PATENT DOCUMENTS

| 4,806,220 | A | | 2/1989 | Finley |
| 4,902,580 | A | | 2/1990 | Gillery |
| 5,059,295 | A | * | 10/1991 | Finley ................... C03C 17/36 204/192.26 |
| 5,514,476 | A | | 5/1996 | Hartig et al. |
| 5,821,001 | A | | 10/1998 | Arbab et al. |
| 6,445,503 | B1 | | 9/2002 | Lingle |

(Continued)

FOREIGN PATENT DOCUMENTS

WO WO 2006/122900 11/2006

OTHER PUBLICATIONS

Pulker (Coatings on glass, 1998, p. 382).*

*Primary Examiner* — Lauren R Colgan
(74) *Attorney, Agent, or Firm* — Nixon & Vanderhye P.C.

(57) ABSTRACT

A coated article is provided which may be heat treated (e.g., thermally tempered) in certain example instances. In certain example embodiments, the coated article includes a low-emissivity (low-E) coating having a zinc stannate based layer provided over a silver-based infrared (IR) reflecting layer, where the zinc stannate based layer is preferably located between first and second silver based IR reflecting layers. The zinc stannate based layer may be provided between and contacting (i) an upper contact layer of or including Ni and/or Cr (or Ti, or TiOx), and (ii) a layer of or including silicon nitride.

27 Claims, 5 Drawing Sheets

(56) References Cited

U.S. PATENT DOCUMENTS

| | | | |
|---|---|---|---|
| 6,514,620 B1 | 2/2003 | Lingle et al. | |
| 6,605,358 B1* | 8/2003 | Stachowiak | C03C 17/36 427/163.1 |
| 6,625,875 B2 | 9/2003 | Sol | |
| 6,692,831 B2 | 2/2004 | Stachowiak | |
| 6,833,194 B1 | 12/2004 | O'Shaughnessy | |
| 8,017,243 B2 | 9/2011 | Blacker et al. | |
| 8,101,278 B2 | 1/2012 | Laird | |
| 8,124,237 B2 | 2/2012 | Nunez-Regueiro et al. | |
| 8,173,263 B2 | 5/2012 | Lingle et al. | |
| 8,187,713 B2 | 5/2012 | Lemmer et al. | |
| 8,202,619 B2 | 6/2012 | Thomsen et al. | |
| 8,281,617 B2 | 10/2012 | Ferreira et al. | |
| 8,389,121 B2 | 3/2013 | Disteldorf et al. | |
| 8,440,037 B2 | 5/2013 | Dietrich et al. | |
| 8,440,310 B2 | 5/2013 | Ferreira et al. | |
| 8,491,760 B2 | 7/2013 | Laird et al. | |
| 2002/0102352 A1* | 8/2002 | Hartig | C03C 17/36 427/165 |
| 2005/0025917 A1* | 2/2005 | Laird | C03C 17/36 428/34 |
| 2005/0196622 A1* | 9/2005 | Laird | C03C 17/36 428/432 |
| 2005/0202254 A1* | 9/2005 | Nunez-Regueiro | C03C 17/36 428/432 |
| 2006/0008657 A1 | 1/2006 | Kriltz et al. | |
| 2009/0258222 A1* | 10/2009 | Roquiny | C03C 17/3639 428/336 |
| 2010/0295330 A1* | 11/2010 | Ferreira | B32B 17/10036 296/84.1 |
| 2011/0261442 A1* | 10/2011 | Knoll | C03C 17/36 359/360 |
| 2012/0219821 A1 | 8/2012 | Frank et al. | |
| 2012/0225224 A1* | 9/2012 | Blacker | C03C 17/36 428/34 |
| 2013/0209828 A1* | 8/2013 | Ridealgh | C03C 17/002 428/623 |
| 2014/0071524 A1* | 3/2014 | Disteldorf | C03C 17/3441 359/360 |
| 2014/0237917 A1* | 8/2014 | Theios | C03C 17/366 52/203 |

* cited by examiner

HEAT TREATABLE COATED ARTICLE WITH LOW-E COATING HAVING ZINC STANNATE BASED LAYER BETWEEN IR REFLECTING LAYERS AND CORRESPONDING METHOD

This invention relates to a coated article including a low emissivity (low-E) coating. In certain example embodiments, the coated article may be heat treated (e.g., thermally tempered, heat bent and/or heat strengthened). In certain example embodiments of this invention, the coated article includes a zinc stannate based layer provided proximate (e.g., over) a silver-based infrared (IR) reflecting layer, where the zinc stannate based layer is preferably located between first and second silver based IR reflecting layers. In certain example embodiments, the zinc stannate based layer is provided between and contacting (i) an upper contact layer of or including Ni and/or Cr, and (ii) a layer of or including silicon nitride, so that for example the layer stack moving away from the glass substrate may include layers comprising the following materials: glass . . . Ag/NiCrOx/ZnSnO/SiN . . . A . . . Low-E coatings according to various embodiments of this invention may, for example, have two or three silver-based IR reflecting layers. It has surprisingly been found that the provision of the zinc stannate based layer results in a coated article having improved thermal stability upon heat treatment (HT). Coated articles according to certain example embodiments of this invention may or may not be heat treated, and may be used in the context of windows such a monolithic or IG window units in example applications.

BACKGROUND AND SUMMARY OF THE INVENTION

Coated articles are known in the art for use in window applications such as insulating glass (IG) window units and/or the like. It is known that in certain instances, it is desirable to heat treat (e.g., thermally temper, heat bend and/or heat strengthen) such coated articles for purposes of tempering, bending, or the like. Heat treatment (HT) of coated articles typically requires use of temperature(s) of at least 580 degrees C., more preferably of at least about 600 degrees C. and still more preferably of at least 620 degrees C. Such high temperatures (e.g., for 5-10 minutes or more) often cause coatings to break down and/or deteriorate or change in an unpredictable manner. Thus, it is desirable for coatings to be able to withstand such heat treatments (e.g., thermal tempering), if HT is desired, in a predictable manner that does not significantly damage the coating.

To be able to produce tempered coated glass articles, architectural coatings such as low-E coatings typically need to be heat treated. As tempered glass is more expensive compared to non-tempered glass, tempered coated articles are typically only utilized if required. Thus, it would be desirable for two products to be offered in the market—one heat treated and one that is not heat treated—namely the actual "as coated" (AC) product with a specific color and thermal performance, as well as a heat treated (HT) mate product which substantially matches the AC product regarding performance and color following heat treatment such as thermal tempering. It is desirable if the color match between AC and HT mates are close enough such that the two products are virtually or essentially indistinguishable to the naked eye when applied side by side in a particular manner. This is achieved when (a) the AC and HT products have the same or similar coating, (b) the coated article can be heat treated (e.g., thermally tempered), and (c) the heat treated coated article has a low $\Delta E^*$ value (e.g., a $\Delta E^*$ value of no greater than 5.0, more preferably no greater than 4.0). The low $\Delta E^*$ value, due to HT, indicates for example that the color of the coated article does not significantly change due to the HT so that the HT version substantially matches the non-HT version of the coated article.

The term $\Delta E^*$ (and $\Delta E$) is well understood in the art and is reported, along with various techniques for determining it, in ASTM 2244-93 as well as being reported in Hunter et. al., *The Measurement of Appearance*, $2^{nd}$ Ed. Cptr. 9, page 162 et seq. [John Wiley & Sons, 1987]. As used in the art, $\Delta E^*$ (and GE) is a way of adequately expressing the change (or lack thereof) in reflectance and/or transmittance (and thus color appearance, as well) in an article after or due to heat treatment. $\Delta E$ may be calculated by the "ab" technique, or by the Hunter technique (designated by employing a subscript "H"). $\Delta E$ corresponds to the Hunter Lab L, a, b scale (or $L_h$, $a_h$, $b_h$). Similarly, $\Delta E^*$ corresponds to the CIE LAB Scale $L^*$, $a^*$, $b^*$. Both are deemed useful, and equivalent for the purposes of this invention. For example, as reported in Hunter et. al. referenced above, the rectangular coordinate/scale technique (CIE LAB 1976) known as the $L^*$, $a^*$, $b^*$ scale may be used, wherein: $L^*$ is (CIE 1976) lightness units; $a^*$ is (CIE 1976) red-green units; $b^*$ is (CIE 1976) yellow-blue units; and the distance $\Delta E^*$ between $L^*_o$ $a^*_o$ $b^*_o$ and $L^*_1$ $a^*_1$ $b^*_1$ is: $\Delta E^* = [(\Delta L^*)^2 + (\Delta a^*)^2 + (\Delta b^*)^2]^{1/2}$, where: $\Delta L^* = L^*_1 - L^*_o$; $\Delta a^* = a^*_1 - a^*_o$; $\Delta b^* = b^*_1 - b^*_o$; where the subscript "o" represents the coating (coated article) before heat treatment and the subscript "1" represents the coating (coated article) after heat treatment; and the numbers employed (e.g., $a^*$, $b^*$, $L^*$) are those calculated by the aforesaid (CIE LAB 1976) $L^*$, $a^*$, $b^*$ coordinate technique. When, for example, glass side reflective $\Delta E^*$ values are measured, then glass side reflective $a^*$, $b^*$ and $L^*$ values are used. In a similar manner, $\Delta E$ may be calculated using the above equation for $\Delta E^*$, i.e., $\Delta E^* = [(\Delta L^*)^2 + (\Delta a^*)^2 + (\Delta b^*)^2]^{1/2}$, by replacing $a^*$, $b^*$, $L^*$ with Hunter Lab values $a_h$, $b_h$, $L_h$. Also within the scope of this invention and the quantification of $\Delta E^*$ are the equivalent numbers if converted to those calculated by any other technique employing the same concept of $\Delta E^*$ as defined above. $\Delta E^*$ is also defined in U.S. Pat. No. 7,964,284, which is incorporated herein by reference.

During the ITT process, the coated glass may be heated to temperature(s) between 650° C. and 750° C. and then subsequently cooled down at a high rate to create intrinsic stress, which results in a higher strength and, as soon as breakage occurs, into a fine breaking pattern. This high temperature treatment causes different processes within the coating (e.g. oxidation, re- crystallization, diffusion, volume changes, stress increase or relaxation etc.) which tend to alter color values of the coated article. Thus, it is desirable that changes (e.g., color changes indicated by changes in $a^*$ and/or $b^*$ color values) in the coating, which are caused by the HT process, remain predictable with varying times of HT.

As will be explained below, it would be desirable if the AC and HT mates substantially match (i.e., substantially matching the AC product which is not heat treated, and the HT product after heat treatment) with respect to color even though the HT version may be heat treated for different periods of time within reason. Practically speaking, a low-E coating is applied to various different glass thicknesses between 4 mm and 12 mm and each of those glass thicknesses requires different heating regimes during the HT process to achieve the required tempered glass properties. In general, thicker glass needs to be heated for a longer time and/or at higher temperatures and it is cooled at lower rates. And coating products are typically sold to various customers who run different models and types of furnaces, e.g. irradiation furnaces, convection furnaces or hybrid models. In each of these furnace types, the heat transfer into glass and coating differs.

Accordingly, it would be desirable to achieve a thermally stable product allowing a HT product to substantially match annealed and non-tempered products with similar or same coatings with respect to color, after the HT process for the HT product independent of the glass thickness and the different furnace types within reason. In other words, it would be desirable for the HT product realize a low $\Delta E^*$ value, such as a $\Delta E^*$ value of no greater than 5.0, more preferably no greater than 4.0, within certain HT time periods such as one or more of 10 minutes, 16 minutes, and/or 24 minutes.

Due to the mentioned processes occurring within the coating during the HT process, some performance and color change cannot be avoided. However, it would be desirable for most or much of these changes to occur at the beginning of, or within a short period of, a HT process (e.g., within the first 8-16 minutes, or within the first 10-12 or 10-16 minutes of HT), so that the heat treated product substantially hits the final desired color values within the first 16 minutes or so of the HT process, so that the product can remain substantially stable with respect to color change over an increased tempering time period of the HT process, independent of the furnace type, if that should occur. Of course, sometimes the HT period will be less than 16 minutes. For example, assuming an example HT process of 24 minutes, it would be desirable for the coated article to substantially realize the final desired color values within the first 16 minutes or so of the HT process, so that the product can remain substantially stable with respect to color change over the time period from about 16 to 24 minutes. Stated another way, it would be desirable for the coated article to realize a lower $\Delta E^*$ value for the 16-24 minutes period of HT than for the 0-16 minutes period of the twenty-four minute heat treatment process. Therefore, for example, a pair of thermally tempered products with the same coating would substantially match when one was heat treated for 12 minutes and the other for 20 minutes.

In certain situations, designers of coated articles strive for a combination of desirable visible transmission, desirable color, low emissivity (or emittance), and low sheet resistance ($R_s$). Low-emissivity (low-E) and low sheet resistance characteristics permit such coated articles to block significant amounts of IR radiation so as to reduce for example undesirable heating of vehicle or building interiors.

Example embodiments of this invention relate to a coated article including a low emissivity (low-E) coating supported by a glass substrate. The coated article may be heat treated (e.g., thermally tempered, heat bent and/or heat strengthened). In certain example embodiments of this invention, the coated article includes a zinc stannate based layer provided over a silver-based infrared (IR) reflecting layer, where the zinc stannate based layer is preferably located between first and second silver based IR reflecting layers. In certain example embodiments, the zinc stannate based layer is provided between and contacting (i) an upper contact layer of or including Ni and/or Cr, and (ii) a layer of or including silicon nitride, so that for example the layer stack moving away from the glass substrate may include layers comprising the following materials: glass . . . Ag/NiCrOx/ZnSnO/SiN . . . Ag . . . Low-E coatings according to various embodiments of this invention may, for example, have two or three silver-based IR reflecting layers. It has surprisingly been found that the provision of the zinc stannate based layer results in a coated article having improved thermal stability upon heat treatment (HT). Such coated articles, if heat treated (e.g., thermally tempered), realize a low $\Delta E^*$ value (glass side reflective and/or transmissive), such as a $\Delta E^*$ value of no greater than 5.0, more preferably no greater than 4.0, within certain HT time periods such as one or more of 10 minutes, 16 minutes, and/or 24 minutes. Moreover, it has surprisingly been found that the provision of the zinc stannate based layer causes the product's glass side reflective and/or transmissive $\Delta E^*$ value to be surprisingly reduced in a desirable manner upon HT compared to if the zinc stannate based layer was not present (e.g., compared to if the zinc stannate based layer was instead a tin oxide layer). Coated articles according to certain example embodiments of this invention may or may not be heat treated, and may be used in the context of windows such a monolithic or IG window units in example applications.

Accordingly, it would be desirable to provide a coated article that is characterized by one or more of: (i) desirable visible transmission, (ii) good durability, (iii) desirable coloration, (iv) desirable emissivity, (v) low haze, and/or (vi) thermal stability upon I-IT so as to realize a glass side reflective $\Delta E^*$ value no greater than about 5.0, more preferably no greater than about 4.5, and most preferably no greater than about 4.0, within certain HT time periods such as one or more of 10 minutes, 16 minutes, and/or 24 minutes.

In certain example embodiments of this invention, there is provided a coated article including a coating supported by a glass substrate, comprising: a first dielectric layer supported by the glass substrate; a first infrared (IR) reflecting layer comprising silver supported by the glass substrate and located over at least the first dielectric layer; an upper contact layer comprising an oxide of Ni and/or Cr, the upper contact layer located over and directly contacting the first IR reflecting layer comprising silver; a layer comprising zinc stannate located over and directly contacting the upper contact layer comprising the oxide of Ni and/or Cr; a first layer comprising silicon nitride located over and directly contacting the layer comprising zinc stannate; a second IR reflecting layer comprising silver located over at least the first layer comprising silicon nitride; and another dielectric layer located over at least the second IR reflecting layer.

In certain example embodiments of this invention, there is provided a method of making a thermally tempered coated article, the method comprising: heat treating, at temperature(s) of at least 600 degrees C., a coated article including a coating supported by a glass substrate, the coating comprising a first dielectric layer supported by the glass substrate, a first infrared (IR) reflecting layer comprising silver supported by the glass substrate and located over at least the first dielectric layer, an upper contact layer comprising an oxide of Ni and/or Cr, the upper contact layer located over and directly contacting the first IR reflecting layer comprising silver, a layer comprising zinc stannate located over and directly contacting the upper contact layer comprising the oxide of Ni and/or Cr, a first layer comprising silicon nitride located over and directly contacting the layer comprising zinc stannate, a second IR reflecting layer comprising silver located over at least the first layer comprising silicon nitride, and another dielectric layer located over at least the second IR reflecting layer; and wherein (i) visible transmission of the coated article substantially plateaus and thus does not change by more than 1.0% between heat treating times of from 12-24 minutes during the heat treating, and/or (ii) the coated article has a haze % of no greater than 0.60% upon heat treatment for all heat treating time periods between 0 and 30 minutes.

DETAILED DESCRIPTION OF EXAMPLES OF THE INVENTION

Figure 1:
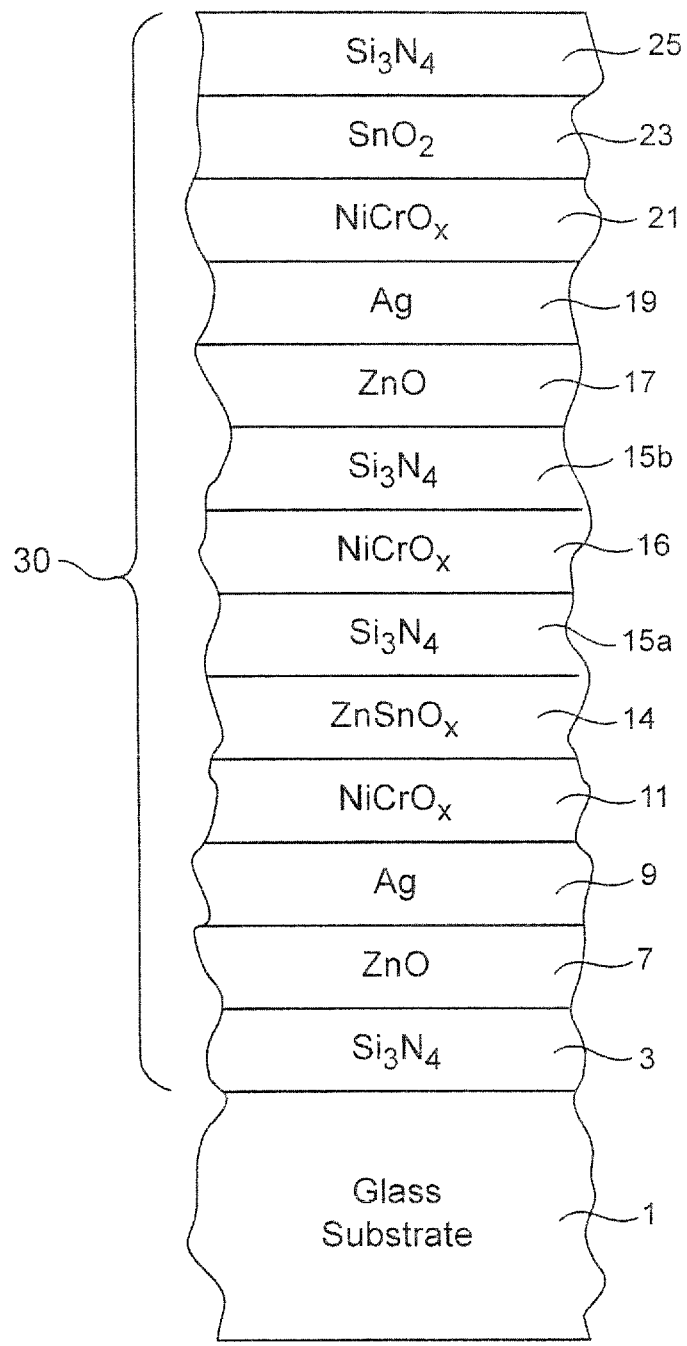
FIG. 1 is a cross sectional view of a coated article according to an example embodiment of this invention.

Referring now more particularly to the accompanying drawings in which like reference numerals indicate like parts throughout the several views/embodiments.

Figure 3:
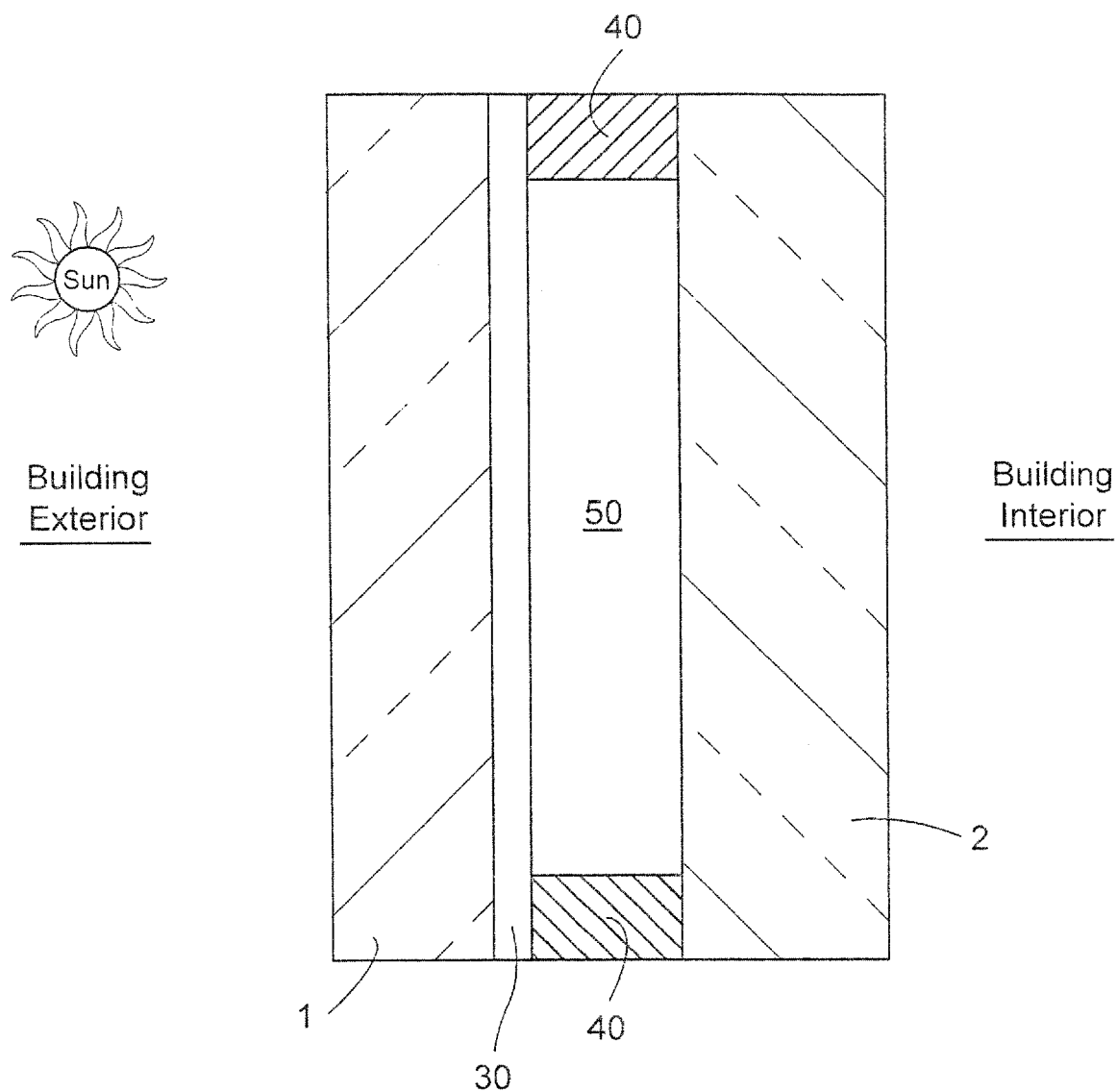
FIG. 3 is a cross sectional view showing the coated article of FIG. 1 or FIG. 2 provided in an IG window unit according to example embodiments of this invention (on surface two of an IG window unit).

Coated articles according to certain example embodiments of this invention may be used in the context of insulating glass (IG) window units, vehicle windows, or other types of windows. For example, coatings herein may be used on surface #2 of an IG window unit as shown in FIG. 3 for example. Coated articles according to example embodiments of this invention are characterized by one, two, three, four, five or all six of: (i) desirable visible transmission, (ii) good durability, (iii) desirable coloration, (iv) desirable emissivity, (v) low haze, and/or (vi) thermal stability upon HT.

Example embodiments of this invention relate to a coated article including a low emissivity (low-E) coating 30 supported by a glass substrate 1. Coating 30 may be sputter-deposited. The coated article may be heat treated (e.g., thermally tempered, heat bent and/or heat strengthened). In certain example embodiments of this invention, the coated article includes a zinc stannate based layer 14 provided over a silver-based infrared (IR) reflecting layer 9, where the zinc stannate based layer 14 is preferably located between first and second silver based IR reflecting layers 9 and 19. In certain example embodiments, the zinc stannate based layer is 14 provided between and contacting (i) an upper contact layer 11 of or including Ni and/or Cr, and (ii) a layer 15 of or including silicon nitride, so that for example the layer stack between and/or including the IR reflecting layers moving away from the glass substrate 1 may include layers comprising the following materials: glass . . . Ag/NiCrOx/ZnSnO/SiN . . . Ag . . . (e.g., see layers 9, 11, 14 and 15 in FIGS. 1-2). Low-E coatings according to various embodiments of this invention may, for example, have two or three silver-based IR reflecting layers.

It has surprisingly been found that the provision of the zinc stannate based layer 14 results in a coated article having improved thermal stability upon heat treatment (HT). Coated articles according to embodiments of this invention, if heat treated (e.g., thermally tempered), realize a low $\Delta E^*$ value (glass side reflective and/or transmissive), such as a $\Delta E^*$ value of no greater than 5.0, more preferably no greater than 4.0, within certain HT time periods such as one or more of 10 minutes, 16 minutes, and/or 24 minutes. It has surprisingly been found that the provision of the zinc stannate based layer 14 causes the product's glass side reflective and/or transmissive $\Delta E^*$ value to be surprisingly reduced in a desirable manner upon HT compared to if the zinc stannate based layer 14 was not present (e.g., compared to if the zinc stannate based layer 14 was instead a tin oxide layer).

In example embodiments, the dielectric zinc stannate (e.g., ZnSnO, $Zn_2SnO_4$, or the like) based layer 14 may include more Zn than Sn by weight. For example, the metal content of zinc stannate based layer 14 may include from about 51-90% Zn and from about 10-49% Sn, more preferably from about 51-70% Zn and from about 30-49% Sn, with an example being about 52% Zn and about 48% Sn (weight %, in addition to the oxygen in the layer) in certain example embodiments of this invention. Thus, for example, the zinc stannate based layer may be sputter-deposited using a metal target comprising about 52% Zn and about 48% Sn in certain example embodiments of this invention. Optionally, the zinc stannate based layer 14 may be doped with other metals such as Al or the like.

Figure 2:
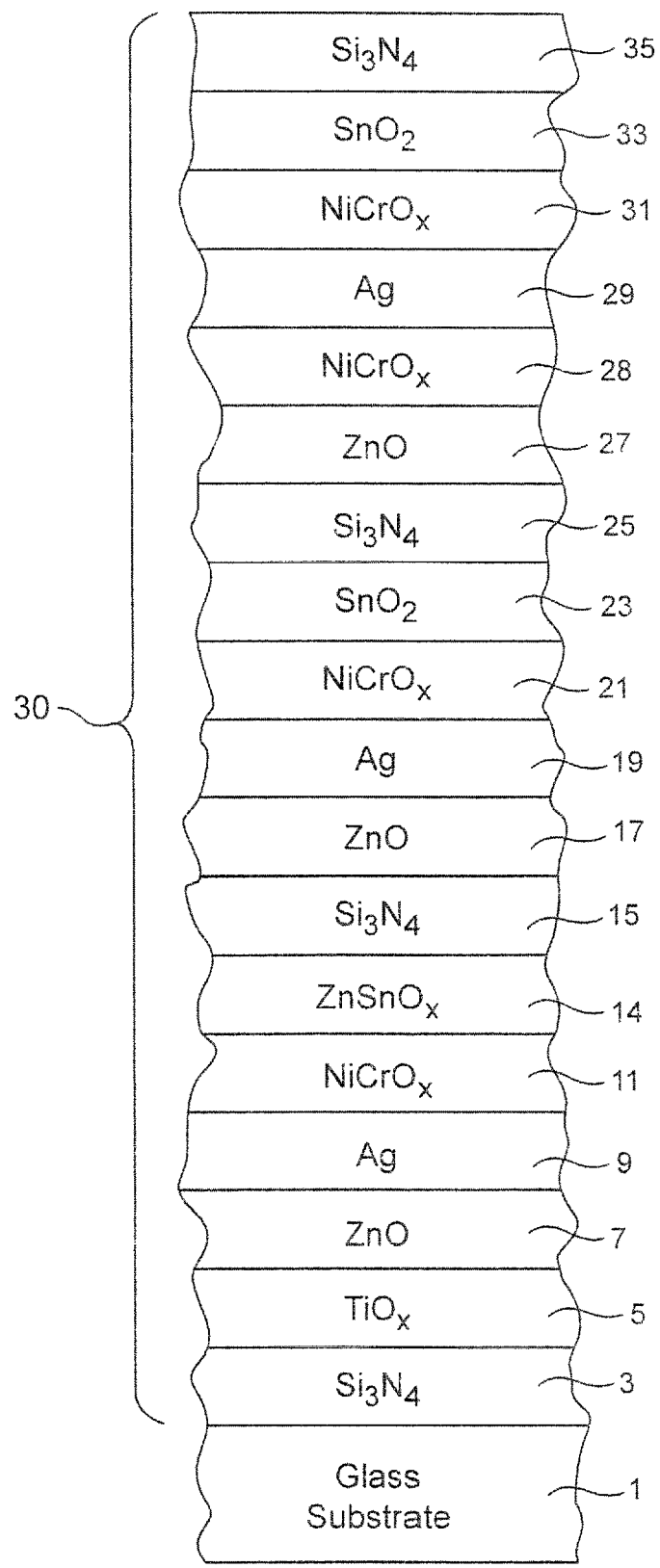
FIG. 2 is a cross sectional view of a coated article according to another example embodiment of this invention.

In certain example embodiments of this invention, the coating 30 includes, a double-silver stack (e.g., see FIG. 1), although this invention is not so limited in all instances (e.g., three silver based layers can be used in certain instances, as shown for example in FIG. 2). It will be recognized that FIGS. 1-2 illustrated coated articles in monolithic form. For example, in certain example embodiments of this invention, heat treated and/or non-HT coated articles having multiple IR reflecting layers (e.g., two or three spaced apart silver based layers) are capable of realizing a sheet resistance ($R_s$) of less than or equal to 3.0 ohms/square (more preferably less than or equal to 2.5, even more preferably less than or equal to 2.0, and most preferably less than or equal to 1.6 ohms/square). In certain example embodiments, in HT or non-HT form, as measured in monolithic form, coated articles herein are capable of realizing a visible transmission (Ill. C, 2 degree) of at least about 40%, more preferably of at least about 50%, more preferably at least about 55%, and most preferably of at least about 60%.

The terms "heat treatment" and "heat treating" as used herein mean heating the article to a temperature sufficient to achieve thermal tempering, heat bending, and/or heat strengthening of the glass inclusive coated article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes or more as discussed herein.

FIG. 1 is a side cross sectional view of a coated article according to an example non-limiting embodiment of this invention, where the low-E coating 30 has two silver-based IR reflecting layers 9 and 19. The coated article includes substrate 1 (e.g., clear, green, bronze, or blue-green glass substrate from about 1.0 to 10.0 mm thick, more preferably from about 1.0 mm to 8.0 mm thick, e.g., about 6 mm thick), and coating (or layer system) 30 provided on the substrate 1 either directly or indirectly. The coating (or layer system) 30 includes: bottom silicon nitride inclusive transparent dielectric layer 3 which may be $Si_3N_4$, of the Si-rich type for haze reduction, or of any other suitable stoichiometry in different embodiments of this invention, first lower contact layer 7 (which contacts IR reflecting layer 9), first conductive and preferably metallic or substantially metallic infrared (IR) reflecting layer 9, first upper contact layer 11 (which contacts layer 9), transparent dielectric layer 14 of or including zinc stannate over and contacting the contact layer 11, transparent dielectric silicon nitride inclusive layers 15a and 15b which may or may not include some oxide, optional absorber and/or barrier layer 16 of or including NiCr, NiCrOx or the like, second lower contact layer 17 (which contacts IR reflecting layer 19), second conductive and preferably metallic or substantially metallic IR reflecting layer 19, second upper contact layer 21 (which contacts layer 19), transparent dielectric layer 23, and transparent silicon nitride inclusive dielectric layer 25. When barrier/absorber layer 16 is not present, the two silicon nitride based layers 15a and 15b can combine to form a single layer 15 of or including silicon nitride. The "contact" layers 7, 11, 17 and 21 each contact at least one IR reflecting layer (e.g., layer based on Ag). The aforesaid layers 3-25 make up sputter-deposited low-E (i.e., low emissivity) coating 30 which is provided on glass or plastic substrate 1.

FIG. 2 is a side cross sectional view of a coated article according to another example embodiment of this invention. FIG. 2 illustrates a triple silver coating 30, whereas FIG. 1 illustrates a double silver coating 30. The FIG. 2 embodiment includes many of the layers illustrated in the FIG. 1 embodiment, as indicated by the reference numerals. The low-E coating 30 of the FIG. 2 embodiment, compared to the FIG. 1 embodiment, further includes transparent dielectric layer 5 of or including titanium oxide (e.g., TiO$_2$), transparent dielectric lower contact layer 27 of or including zinc oxide, transparent third lower contact layer 28 of or including NiCr, NiCrOx or the like, third conductive and preferably metallic or substantially metallic IR reflecting layer 29, third upper contact layer 31 (which contacts layer 29), transparent dielectric layer 33, and transparent silicon nitride inclusive dielectric layer 35. NiCr or NiCrOx barrier layer 16 from the FIG. 1 embodiment need not be present in the FIG. 2 embodiment.

In each of the FIGS. 1 and 2 embodiments, it is also possible to replace tin oxide layer 33 with a zinc stannate layer similar to layer 14 so that the zinc stannate layer would be over and directly contacting contact layer 31. This could be advantageous for reasons similar to those explained above.

In monolithic instances, the coated article includes only one glass substrate 1 as illustrated in FIGS. 1-2. However, monolithic coated articles herein may be used in devices such as laminated vehicle windshields, IG window units, and the like. As for IG window units, an IG window unit may include at least two spaced apart glass substrates. An example IG window unit is illustrated and described, for example, in U.S. Patent Document No. 2004/0005467, the disclosure of which is hereby incorporated herein by reference. FIG. 3 shows an example IG window unit including the coated glass substrate 1 shown in FIG. 1 or FIG. 2 coupled to another glass substrate 2 via spacer(s), sealant(s) 40 or the like, with a gap 50 being defined therebetween. This gap 50 between the substrates in IG window unit embodiments may in certain instances be filled with a gas such as argon (Ar), or a mixture of Ar gas and air. An example IG unit may comprise a pair of spaced apart clear glass substrates 1 and 2 each about 3-8 mm thick (e.g., about 6 mm thick), one of which is coated with a coating 30 herein in certain example instances, where the gap 50 between the substrates may be from about 5 to 30 mm, more preferably from about 10 to 20 mm, and most preferably about 16 mm. In certain example instances, the low-E coating 30 may be provided on the interior surface of either substrate facing the gap (the coating is shown on the interior major surface of substrate 1 in FIG. 3 facing the gap 50, but instead could be on the interior major surface of substrate 2 facing the gap 50). Either substrate 1 or substrate 2 may be the outermost substrate of the IG window unit at the building exterior (e.g., in FIG. 3 the substrate 1 is the substrate closest to the building exterior, and the low-E coating 30 is provided on surface #2 of the IG window unit). In preferred embodiments of this invention, the coating 30 is provided on surface #2 of the IG window unit as shown in FIG. 3. In certain example embodiments of this invention, the coating 30 of FIG. 1 or FIG. 2 could also be used in a triple glazed IG window unit, such as being located on surface #2 of such a triple glazed IG window unit or on any other suitable surface of such a unit.

Dielectric layers 3, 15 (which includes 15a, 15b), 25 and 35 may be of or include silicon nitride in certain embodiments of this invention. Silicon nitride layers 3, 15, 25 and 35 may, among other things, improve heat-treatability of the coated articles, e.g., such as thermal tempering or the like, and may or may not include some oxygen. The silicon nitride of layers 3, 15, 25 and/or 35 may be of the stoichiometric type (i.e., Si$_3$N$_4$), or alternatively of the Si-rich type in different embodiments of this invention. For example, Si-rich silicon nitride 3 (and/or 15, and/or 25) combined with zinc stannate 14 may permit the silver to be deposited (e.g., via sputtering or the like) in a manner which causes its sheet resistance to be lessened compared to if certain other material(s) were under the silver. Moreover, the presence of free Si in a Si-rich silicon nitride layer(s) may allow certain atoms such as sodium (Na) which migrate outwardly from the glass 1 during heat treatment (HT) to be more efficiently stopped by the Si-rich silicon nitride inclusive layer before they can reach the silver and damage the same.

In certain example embodiments, when Si-rich silicon nitride is used in one or more of layers 3, 15, 25, the Si-rich silicon nitride layer as deposited may be characterized by Si$_x$N$_y$ layer(s), where x/y may be from 0.76 to 1.5, more preferably from 0.8 to 1.4, still more preferably from 0.85 to 1.2. Moreover, in certain example embodiments, before and/or after HT the Si-rich Si$_x$N$_y$ layer(s) may have an index of refraction "n" of at least 2.05, more preferably of at least 2.07, and sometimes at least 2.10 (e.g., 632 nm) (note: stoichiometric Si$_3$N$_4$ which may also be used has an index "n" of 2.02-2.04). In certain example embodiments, it is surprisingly been found that improved thermal stability is especially realizable when the Si-rich Si$_x$N$_y$ layer(s) as deposited has an index of refraction "n" of at least 2.10, more preferably of at least 2.20, and most preferably from 2.2 to 2.4. Also, the Si-rich. Si$_x$N$_y$ layer in certain example embodiments may have an extinction coefficient "k" of at least 0.001, more preferably of at least 0.003 (note: stoichiometric Si$_3$N$_4$ has an extinction coefficient "k" of effectively 0). Again, in certain example embodiments, it has surprisingly been found that improved thermal stability can be realized when "k" for the Si-rich Si$_x$N$_y$ layer(s) is from 0.001 to 0.05 as deposited (550 nm). It is noted that n and k tend to drop due to heat treatment. Any and/or all of the silicon nitride layers 3, 15, 25, 35 discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in an atmosphere including at least nitrogen gas in certain embodiments of this invention.

Infrared (IR) reflecting layers 9, 19 and 29 are preferably substantially or entirely metallic and/or conductive, and may comprise or consist essentially of silver (Ag), gold, or any other suitable IR reflecting material. IR reflecting layers 9, 19 and 29 help allow the coating to have low-E and/or good solar control characteristics. The IR reflecting layers may, however, be slightly oxidized in certain embodiments of this invention.

The upper contact layers 11, 21 and 31 (and possibly lower contact layer 28) may be of or include nickel (Ni) oxide, chromium/chrome (Cr) oxide, or a nickel alloy oxide such as nickel chrome oxide ($NiCrO_x$), or other suitable material(s) such as Ti or an oxide of Ti, in certain example embodiments of this invention. The use of, for example, $NiCrO_x$ in these layers allows durability to be improved. The $NiCrO_x$ of these layers may be fully oxidized in certain embodiments of this invention (i.e., fully stoichiometric), or alternatively may only be partially oxidized (i.e., sub-oxide). In certain instances, the $NiCrO_x$ layers may be at least about 50% oxidized. Contact layers 11, 21, 28, and/or 31 (e.g., of or including an oxide of Ni and/or Cr) may or may not be oxidation graded in different embodiments of this invention. Oxidation grading means that the degree of oxidation in the layer changes throughout the thickness of the layer. For example, a contact layer may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layers 11, 21, 28 and/or 29 (e.g., of or including an oxide of Ni and/or Cr) may or may not be continuous in different embodiments of this invention across the entire underlying or overlying IR reflecting layer.

Transparent dielectric layers 23 and 33 may be of or include tin oxide in certain example embodiments of this invention. However, it may be doped with certain other materials in other example embodiments, such as with Al or Zn in certain example alternative embodiments.

Lower contact or seed layers 7 and/or 17, and transparent dielectric layer 27, in certain embodiments of this invention are of or include zinc oxide (e.g., ZnO). The zinc oxide of these layers may contain other materials as well such as Al (e.g., to form $ZnAlO_x$). For example, in certain example embodiments of this invention, one or more of zinc oxide layers 7, 17, 27 may be doped with from about 1 to 10% Al, more preferably from about 1 to 5% Al, and most preferably about 1 to 4% Al.

Zinc stannate based layer 14 is provided over and contacting upper contact layer 11 comprising an oxide of Ni and/or Cr, and under and possibly contacting layer 15 (or 15a) of or including silicon nitride, in a central portion of the layer stack between first and second IR reflecting layers 9 and 19. As mentioned above, it has surprisingly been found that this layer stack significantly improves thermal stability upon HT and improves durability. In certain alternative embodiments, it is possible to dope the zinc stannate based layer 14 (e.g., ZnSnO) with other materials such as Al, Zn, N, or the like. The zinc stannate based layer 14 is substantially or substantially fully oxided in preferred embodiments of this invention. As explained above, the presence of the zinc stannate based layer 14 is the illustrated location has been found to surprisingly improve thermal stability of the coating, as will be more fully evidenced below with the examples vs. comparative examples herein.

Other layer(s) below or above the illustrated coating may also be provided. Thus, while the layer system or coating is on or "supported by" substrate 1 (directly or indirectly), other layer(s) may be provided therebetween. Thus, for example, the coating of FIG. 1 or FIG. 2 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers on the glass substrate 1 in the FIG. 1 embodiment are as follows, from the glass substrate outwardly:

Example Materials/Thicknesses; FIG. 1 Embodiment

| Layer Glass (1-10 mm thick) | Preferred Range (Å) | More Preferred (Å) | Example (Å) |
| --- | --- | --- | --- |
| $Si_xN_y$ (layer 3) | 40-600 Å | 200-500 Å | 354 Å |
| $ZnAlO_x$ (layer 7) | 10-300 Å | 60-140 Å | 100 Å |
| Ag (layer 9) | 50-250 Å | 80-120 Å | 110 Å |
| $NiCrO_x$ (layer 11) | 10-100 Å | 20-40 Å | 30 Å |
| ZnSnO (layer 14) | 200-800 Å | 350-600 Å | 472 Å |
| $Si_xN_y$ (layer 15a) | 50-350 Å | 80-200 Å | 120 Å |
| $NiCrO_x$ (layer 16) | 25-60 Å | 30-60 Å | 40 Å |
| $Si_xN_y$ (layer 15b) | 50-350 Å | 150-250 Å | 204 Å |
| $ZnAlO_x$ (layer 17) | 10-300 Å | 60-140 Å | 100 Å |
| Ag (layer 19) | 120-260 Å | 150-240 Å | 207 Å |
| $NiCrO_x$ (layer 21) | 10-100 Å | 20-40 Å | 30 Å |
| $SnO_2$ (layer 23) | 0-750 Å | 70-180 Å | 100 Å |
| $Si_3N_4$ (layer 25) | 10-750 Å | 100-170 Å | 120 Å |

It can be seen that in certain example embodiments of this invention, the zinc stannate inclusive layer 14 is the thickest layer in the coating 30, and thus may be thicker than all other layers in the coating 30. In certain example embodiments, the zinc stannate inclusive layer 14 is located between and directly contacting contact layer (e.g., oxide of Ni and/or Cr) 11 and silicon nitride inclusive layer 15a (or 15). In certain example embodiments, the zinc stannate inclusive layer 14 is at least two times thicker (more preferably at least five times thicker, and most preferably at least ten times thicker) than is the immediately adjacent contact layer (e.g., oxide of Ni and/or Cr) 11. In certain example embodiments, the zinc stannate inclusive layer 14 is at least two times thicker (more preferably at least three times thicker) than is the immediately adjacent silicon nitride based layer 15a (or 15). These apply to the FIG. 1 and/or FIG. 2 embodiments.

It can be seen that in certain example embodiments of this invention (e.g., see FIG. 1), the upper silver based IR reflecting layer 19 is thicker than the lower silver based IR reflecting layer 9. In certain example embodiments, the upper silver based IR reflecting layer 19 is at least 20 angstroms thicker (more preferably at least 40 angstroms thicker, more preferably at least 60 angstroms thicker, and most preferably at least 70 angstroms thicker) than is the lower silver based IR reflecting layer 9. All thicknesses herein are physical thicknesses.

In certain example embodiments of this invention, coated articles according to the FIG. 1 embodiment may have the following optical and solar characteristics when measured monolithically before and/or after optional HT. The sheet resistances ($R_s$) herein take into account all IR reflecting layers (e.g., silver layers 9, 19).

Optical/Solar Characteristics (FIG. 1 Embodiment; Monolithic)

| Characteristic | General | More Preferred | Most Preferred |
|---|---|---|---|
| $R_s$ (ohms/sq.): | <=3.0 | <=2.5 | <=2.0 or <=1.6 |
| $E_n$: | <=0.07 | <=0.04 | <=0.03 |
| $T_{vis}$ (Ill. C 2°): | >=40% | >=45% | >=50% |

While various thicknesses and materials may be used in layers in different embodiments of this invention, example thicknesses and materials for the respective layers on the glass substrate 1 in the FIG. 2 embodiment are as follows, from the glass substrate outwardly:

Example Materials/Thicknesses; FIG. 2 Embodiment

| Layer Glass (1-10 mm thick) | Preferred Range (Å) | More Preferred (Å) | Example (Å) |
|---|---|---|---|
| $Si_xN_y$ (layer 3) | 40-600 Å | 100-300 Å | 136 Å |
| $TiO_x$ (layer 5) | 7-150 Å | 7-50 Å | 10 Å |
| $ZnAlO_x$ (layer 7) | 10-300 Å | 60-140 Å | 90 Å |
| Ag (layer 9) | 50-250 Å | 80-120 Å | 109 Å |
| $NiCrO_x$ (layer 11) | 10-100 Å | 20-40 Å | 30 Å |
| ZnSnO (layer 14) | 200-800 Å | 350-600 Å | 435 Å |
| $Si_xN_y$ (layer 15) | 50-350 Å | 80-200 Å | 130 Å |
| $ZnAlO_x$ (layer 17) | 80-300 Å | 170-250 Å | 220 Å |
| Ag (layer 19) | 60-160 Å | 90-130 Å | 110 Å |
| $NiCrO_x$ (layer 21) | 10-100 Å | 20-40 Å | 30 Å |
| $SnO_2$ (layer 23) | 50-750 Å | 150-300 Å | 220 Å |
| $Si_3N_4$ (layer 25) | 10-750 Å | 100-170 Å | 130 Å |
| $ZnAlO_x$ (layer 27) | 50-300 Å | 190-260 Å | 238 Å |
| $NiCrO_x$ (layer 28) | 7-40 Å | 7-20 Å | 10 Å |
| Ag (layer 29) | 50-250 Å | 120-135 Å | 120 Å |
| $NiCrO_x$ (layer 31) | 10-100 Å | 20-40 Å | 30 Å |
| $SnO_2$ (layer 33) | 0-750 Å | 50-120 Å | 75 Å |
| $Si_3N_4$ (layer 35) | 10-750 Å | 100-250 Å | 201 Å |

In certain example embodiments of this invention, coated articles according to the FIG. 2 embodiment may have the following optical and solar characteristics when measured monolithically before and/or after optional HT. The sheet resistances ($R_s$) herein take into account all IR reflecting layers (e.g., silver layers 9, 19, 29).

Optical/Solar Characteristics (FIG. 2 Embodiment Monolithic)

| Characteristic | General | More Preferred | Most Preferred |
|---|---|---|---|
| $R_s$ (ohms/sq.): | <=3.0 | <=2.5 | <=2.0 or <=1.6 or <=1.4 |
| $E_n$: | <=0.07 | <=0.04 | <=0.03 |
| $T_{vis}$ (Ill. C 2°): | >=40% | >=50% | >=60% |

The following examples are provided for purposes of example only, and are not intended to be limiting unless specifically claimed.

Examples—FIG. 1 Embodiment

The following examples were made via sputtering a coating as shown in FIG. 1 on a 6 mm thick clear glass substrate 1 so as to have the layer stacks set forth below. The thicknesses are in units of angstroms (Å). It can be seen that the Comparative Example was the same as Example 1 of this invention except that the zinc stannate layer 14 in Example 1 of this invention was used instead of the tin oxide layer in the Comparative Example ("n/a" means that the applicable layer was not present in that example). In other words, Example 1 according to this invention was the same as the Comparative Example (CE) except that the tin oxide layer in the middle dielectric portion of the CE was replaced with the zinc stannate layer 14 in Example 1 according to this invention.

| Layer Glass Substrate | Comparative Example | Example 1 |
|---|---|---|
| $Si_3N_4$ | 354 | 354 |
| ZnAlO | 100 | 100 |
| Ag | 110 | 110 |
| $NiCrO_x$ | 30 | 30 |
| $SnO_2$ | 472 | n/a |
| ZnSnO | n/a | 472 |
| $Si_3N_4$ | 120 | 120 |
| $NiCrO_x$ | 40 | 40 |
| $Si_3N_4$ | 204 | 204 |
| ZnO | 100 | 100 |
| Ag | 207 | 207 |
| $NiCrO_x$ | 30 | 30 |
| $SnO_2$ | 100 | 100 |
| $Si_3N_4$ | 120 | 120 |

After being sputter deposited onto the glass substrates 1, the samples of the CE and Example 1 were heat treated (HT) for various times between 12 and 30 minutes in a box furnace at 650 degrees C. The Table immediately below illustrates the results for the Comparative Example (CE) and shows various color values (a*, b*), visible transmission % (TY), L* values, visible glass side reflectance (RgY), visible film side reflectance (RfY), sheet resistance ($R_s$ in units of ohms/square), and haze % after various times of heat treatment [Ill. C 2 deg. Observer]. In order to obtain the data below, multiple identical CEs were made and a respective one was removed and measurements taken therefrom after each of the HT times in the table immediately below. The table below for the CE also illustrates the transmissive, glass side reflective, and film side reflective ΔE* values due to the HT period of from 0-16 minutes (ΔE* 0/16). In particular, for a 16 minute heat treatment at 650 degrees C., the CE realized a transmissive ΔE* value of 3.27, a glass side reflective ΔE* value of 1.29, and a film side reflective ΔE* value of 2.16. The row ΔE* 16/30 in the table below indicates the change in ΔE* between the CE sample that was heat treated for 16 minutes and the CE sample that was heat treated for 30 minutes. Thus, regarding glass side reflective ΔE* values for example, ΔE* changed 1.29 during the first 16 minutes of HT, but then changed an additional 2.87 for the further HT period from the 16 minute mark to the 30 minutes mark. Therefore, it will be appreciated that the glass side reflective color values did not stabilize and continued to significantly change during the HT period from the 16 minute mark to the 30 minute mark.

Table for Comparative Example (CE) for Various HT Times

| HT time (min.) | TY | TL* | Ta* | Tb* | Rg Y | Rg L | Rg a* | Rg b* | RfY | Rf L | Rf a* | Rf b* | Rs (Ω/squ.) | Haze (%) |
|---|---|---|---|---|---|---|---|---|---|---|---|---|---|---|
| 0 | 51.65 | 77.07 | −7.57 | 1.82 | 11.01 | 39.59 | −1.36 | −10.46 | 20.19 | 52.05 | 8.88 | 11.89 | 1.66 | 0.00 |
| 12 | 53.35 | 78.08 | −6.69 | −1.01 | 11.05 | 39.67 | 0.58 | −10.29 | 20.56 | 52.46 | 9.03 | 12.88 | 1.59 | 0.34 |
| 14 | 53.59 | 78.22 | −6.52 | −0.99 | 11.44 | 40.31 | −0.17 | −10.31 | 21.21 | 53.18 | 8.30 | 12.00 | 1.50 | 0.50 |
| 16 | 53.72 | 78.30 | −6.50 | −1.01 | 11.73 | 40.78 | −0.91 | −10.68 | 21.69 | 53.70 | 7.68 | 11.18 | 1.40 | 0.36 |
| 18 | 53.71 | 78.29 | −6.76 | −1.14 | 11.25 | 40.00 | −0.60 | −11.49 | 21.10 | 53.06 | 8.03 | 10.51 | 1.48 | 0.37 |
| 22 | 53.03 | 77.89 | −6.92 | −1.48 | 11.76 | 40.83 | −2.18 | −11.55 | 21.76 | 53.77 | 7.95 | 10.14 | 1.37 | 0.48 |
| 24 | 52.40 | 77.52 | −7.45 | −1.64 | 11.75 | 40.81 | −2.43 | −12.15 | 21.78 | 53.79 | 8.72 | 9.33 | 1.37 | 0.91 |
| 30 | 51.05 | 76.71 | −8.12 | −2.15 | 12.53 | 42.05 | −3.16 | −11.94 | 22.32 | 54.37 | 9.60 | 8.68 | 1.38 | 1.03 |
| ΔE* 0/16 | | 3.27 | | | | 1.29 | | | | 2.16 | | | | |
| ΔE* 16/30 | | 2.54 | | | | 2.87 | | | | 3.22 | | | | |

The Table immediately below illustrates the results for Example 1 according to this invention, and shows various color values (a*, b*), visible transmission % (TY), L* values, visible glass side reflectance (RgY), visible film side reflectance (RfY), sheet resistance ($R_s$ in units of ohms/square), and haze % after various times of heat treatment [Ill. C 2 deg. Observer]. In order to obtain the data below, multiple identical samples of Example 1 were made and a respective one was removed and measurements taken therefrom after each of the HT times in the table immediately below. The table below for Example 1 also illustrates the transmissive, glass side reflective, and film side reflective ΔE* values due to the HT period of from 0-16 minutes (ΔE* 0/16). In particular, for a 16 minute heat treatment at 650 degrees C., Example 1 realized a transmissive ΔE* value of 2.50, a glass side reflective ΔE* value of 2.70, and a film side reflective ΔE* value of 3.74. The row ΔE* 16/30 in the table below indicates the change in ΔE* between the Example 1 sample that was heat treated for 16 minutes and the Example 1 sample that was heat treated for 30 minutes. Thus, regarding glass side reflective ΔE* values for example, ΔE* changed 2.70 during the first 16 minutes of HT, but then changed only an additional 1.25 for the further HT period from the 16 minute mark to the 30 minutes mark. And regarding transmissive ΔE* values for Example 1, ΔE* changed 2.50 during the first 16 minutes of HT, but then changed only an additional 0.93 for the further HT period from the 16 minute mark to the 30 minutes mark.

advantages associated with using the zinc stannate based layer 14 (the zinc stannate layer 14 was present in Example 1, but not in the CE). Unlike the CE, Example 1 was able to substantially realize substantially its final desired color values (e.g., a*, b* and L* in one or both of transmissive or glass side reflective) within the first 16 minutes or so of the HT process, so that Example 1 remained substantially stable with respect to a*, b* and L* values (glass side reflective and/or transmissive) over the heat treating time period of from 16 to 30 minutes. Therefore, for example, a pair of thermally tempered products of Example 1 would substantially match each other with respect to transmissive and glass side reflective values when one was heat treated for 16 minutes and the other for 30 minutes. This would not be the case for the CE, noting the undesirably high transmissive ΔE* value over 5 for the CE for the heat treating period of from 0 to 30 minutes which value is obtained by adding transmissive ΔE* 0/16 (3.27) and transmissive ΔE* 16/30 (2.54) for the CE. Moreover, Example 1 advantageously had glass side reflective, film side reflective, and transmissive ΔE* 16/30 values that were lower than the corresponding glass side reflective, film side reflective, and transmissive ΔE* 0/16 values which indicates that the appearance of the samples in Example 1 substantially stabilized prior to potential lengthy heat treatment processing—whereas the CE could not achieve this for glass side reflective or film side reflective ΔE* values, again indicating that the use of the zinc stannate based layer 14 surprisingly improved the Table for Example 1 for Various HT Times

| HT time (min.) | TY | TL* | Ta* | Tb* | Rg Y | Rg L | Rg a* | Rg b* | RfY | Rf L | Rf a* | Rf b* | Rs (Ω/squ.) | Haze (%) |
|---|---|---|---|---|---|---|---|---|---|---|---|---|---|---|
| 0 | 50.30 | 76.25 | −7.63 | 0.95 | 11.77 | 40.85 | −2.32 | −12.23 | 21.73 | 53.74 | 8.72 | 12.16 | 1.55 | 0.00 |
| 12 | 53.89 | 78.40 | −7.35 | −0.38 | 11.52 | 40.44 | −0.9 | −13.38 | 22.55 | 54.61 | 7.06 | 10.37 | 1.23 | 0.34 |
| 14 | 53.86 | 78.38 | −7.34 | −0.49 | 11.57 | 40.53 | −0.95 | −13.27 | 22.70 | 54.76 | 8.98 | 10.51 | 1.22 | 0.36 |
| 16 | 53.89 | 78.40 | −7.08 | −0.20 | 11.52 | 40.44 | −0.64 | −14.30 | 22.71 | 54.77 | 7.18 | 8.91 | 1.20 | 0.31 |
| 18 | 54.01 | 78.47 | −7.12 | −0.03 | 11.67 | 40.69 | −0.83 | −14.50 | 22.81 | 54.88 | 7.16 | 8.45 | 1.21 | 0.30 |
| 22 | 53.64 | 78.25 | −6.92 | −0.39 | 11.72 | 40.77 | −1.51 | −13.90 | 23.05 | 55.12 | 6.78 | 9.59 | 1.25 | 0.41 |
| 24 | 53.71 | 78.29 | −6.98 | −0.44 | 11.65 | 40.65 | −1.30 | −13.82 | 22.98 | 55.05 | 6.96 | 9.15 | 1.23 | 0.47 |
| 30 | 53.01 | 77.88 | −7.24 | −0.96 | 11.29 | 42.06 | −1.75 | −14.74 | 22.36 | 54.41 | 8.08 | 8.20 | 1.31 | 0.54 |
| ΔE* 0/16 | | 2.50 | | | | 2.70 | | | | 3.74 | | | | |
| ΔE* 16/30 | | 0.93 | | | | 1.25 | | | | 1.20 | | | | |

Therefore, unlike the CE, it can be seen from the above tables that in Example 1 when the zinc stannate layer 14 was present at least the glass side reflective color values and the transmissive color values did indeed stabilize and did not significantly change during the HT from the 16 minute mark to the 30 minute mark. In particular, the ΔE* 16/30 values for Example 1 were significantly and surprisingly lower than those for the CE, thereby demonstrating the unexpected thermal stability of the coating. Furthermore, it can be seen that all transmissive ΔE* values were significantly better (lower) for Example 1 than for the corresponding ΔE* values for the CE.

Figure 4:
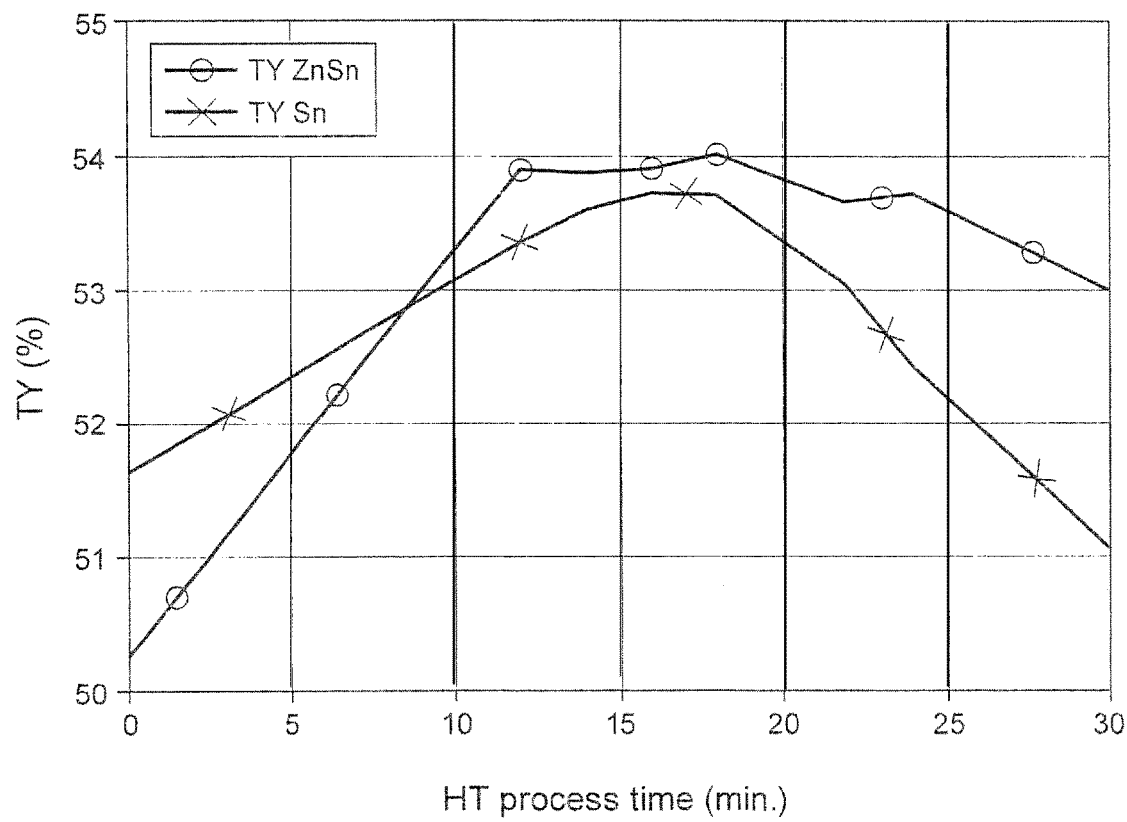
FIG. 4 is a heat treatment (HT) time, in minutes, versus visible transmission (TY %) graph plotting Example 1 versus a Comparative Example (CE).
Figure 5:
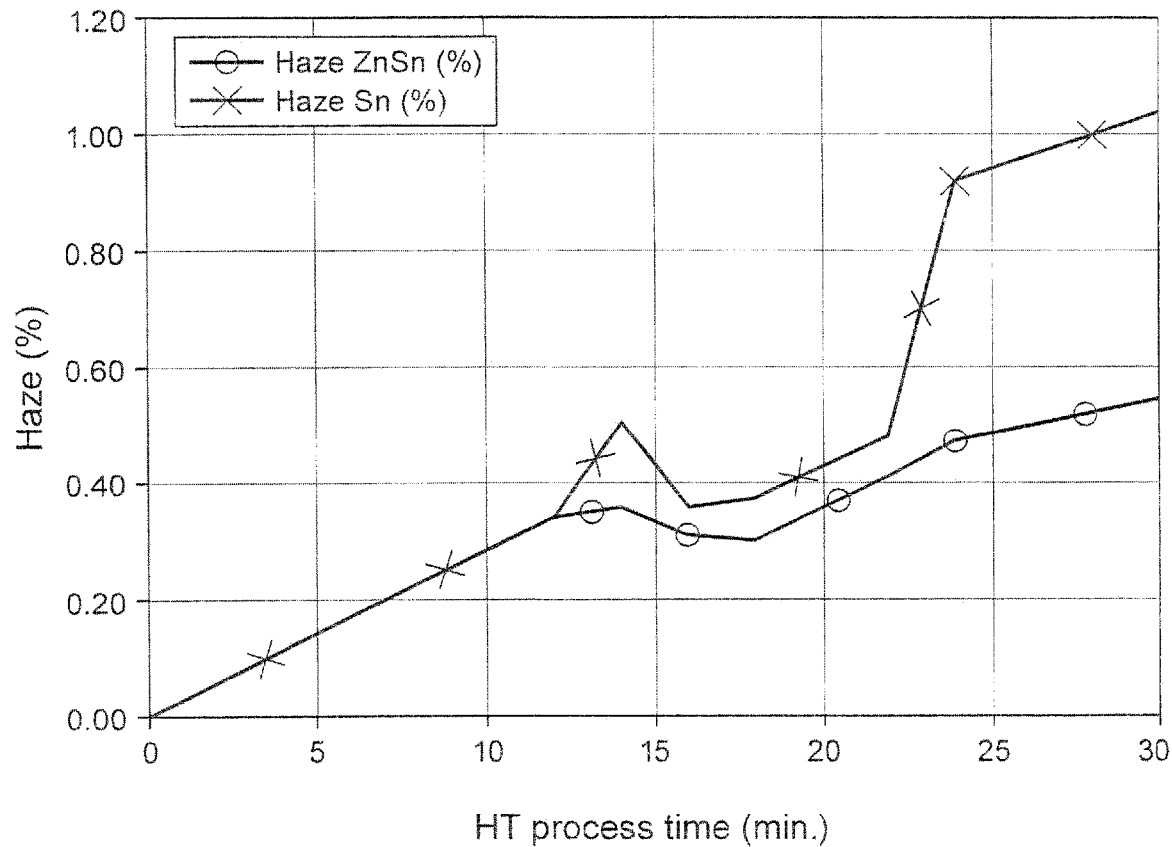
FIG. 5 is a heat treatment (HT) time, in minutes, versus haze % graph plotting Example 1 versus a Comparative Example (CE).

FIGS. 4-5 also illustrate the improved thermal stability achieved by use of the zinc stannate based layer 14 as shown in FIG. 1. FIG. 4 is a heat treatment (HT) time, in minutes, versus visible transmission (TY %) graph plotting Example 1 versus the Comparative Example (CE); and FIG. 5 is a heat treatment (HT) time, in minutes, versus haze % graph plotting Example 1 versus the CE. The Example 1 plot (ZnSn) in FIGS. 4-5 has a plurality of circles, whereas the CE plot (Sn) in FIGS. 4-5 has a plurality of Xs. FIG. 4 illustrates that the visible transmission of Example 1 substantially plateaus (e.g., does not change by more than 1.5%, more preferably does not change by more than 1.0%) between HT times of from about 12-24 minutes, whereas the visible transmission for the CE substantially plateaus for a much shorter HT time period, thereby demonstrating that Example 1 is more thermally stable with respect to visible transmission than is the CE. This is advantageous because in real world applications the coating will likely be heat treated for different periods of time based on the thickness of the supporting glass 1 to which the coating is applied and the type of furnace used by the heat treater, and the improved thermal stability over a longer HT range is advantageous because it allows a greater percentage of the manufactured coatings to realized the appearance ultimately desired. Likewise, FIG. 5 illustrates that Example 1 was fairly stable with respect to haze % from the 22-30 minute marks of HT, whereas the CE spiked significantly upward in an undesirable manner after the 22 minute mark of HT. Again, this demonstrates that Example 1 with respect to haze was thermally stable over a longer range of potential HT times than was the CE. Coated articles in example embodiments of this invention realize a haze % of no greater than 0.60% over the entire HT period of from 0-30 minutes. Again, the thermal stability over a longer period of potential HT time with respect to haze, color, and/or visible transmission is advantageous because in real world applications the coating will likely be heat treated for different periods of time based on the thickness of the supporting glass 1 to which the coating is applied and the type of furnace used by the fabricator heat treater, and the improved thermal stability over a longer HT range is advantageous because it allows a greater percentage of the manufactured coatings to realized the appearance ultimately desired.

Examples—FIG. 2 Embodiment

The following examples were made via sputtering a coating as shown in FIG. 2 on a 6 mm thick clear glass substrate 1 so as to have the layer stacks set forth below. The thicknesses are in units of angstroms (Å). It can be seen that the Comparative Example (CE) was the same as Example 2 of this invention except that the tin oxide layer adjacent the zinc stannate layer 14 in the CE was not present in Example 2 of this invention ("n/a" means that the applicable layer was not present in that example). In other words, Example 2 according to this invention was essentially the same as the Comparative Example (CE) except for the zinc stannate thickness and that the zinc stannate layer 14 in Example 2 was in direct contact with the NiCrOx contact layer 11 (as opposed to having a tin oxide layer therebetween in the CE). The zinc stannate layers were sputtered via ZnSn targets with a Zn/Sn wt. % ratio of 52/48.

| Layer<br>Glass Substrate | Comparative<br>Example | Example<br>2 |
|---|---|---|
| $Si_3N_4$ | 136 | 136 |
| $TiO_x$ | 10 | 10 |
| ZnAlO | 90 | 90 |
| Ag | 109 | 109 |
| $NiCrO_x$ | 30 | 30 |
| $SnO_2$ | 267 | n/a |
| ZnSnO | 167 | 435 |
| $Si_3N_4$ | 130 | 130 |
| ZnO | 220 | 220 |
| Ag | 110 | 110 |
| $NiCrO_x$ | 30 | 30 |
| $SnO_2$ | 220 | 220 |
| $Si_3N_4$ | 130 | 130 |
| ZnO | 238 | 238 |
| $NiCrO_x$ | 10 | 10 |
| Ag | 120 | 120 |
| $NiCrO_x$ | 30 | 30 |
| $SnO_2$ | 75 | 75 |
| $Si_3N_4$ | 201 | 201 |

After being sputter deposited onto the glass substrates 1, the samples of the CE and Example 2 were then heat treated (HT) for various times from 10-24 minutes in a box furnace at 650 degrees C. The Table immediately below illustrates certain results for both the Comparative Example (CE) and Example 2 [Ill. C 2 deg. Observer]. See the discussion regarding the data above regarding Example 1 for an understanding of the data.

| | Comparative<br>Example | Example<br>2 |
|---|---|---|
| ΔE* 0/16<br>Glass side reflective | 2.46 | 1.81 |
| ΔE* 16/24<br>Glass side reflective | 2.11 | 1.21 |
| ΔE* 0/16<br>Transmissive | 2.32 | 2.73 |
| ΔE* 16/24<br>Transmissive | 2.14 | 0.69 |
| $R_s$ (ohms/square)<br>No HT | 1.64 | 1.63 |
| $R_s$ (ohms/square)<br>14 min. HT | 1.49 | 1.36 |
| $R_s$ (ohms/square)<br>16 min. HT | 1.38 | 1.36 |
| $R_s$ (ohms/square)<br>24 min. HT | 1.34 | 1.35 |

For example, for a 16 minute heat treatment at 650 degrees C., the CE realized a glass side reflective ΔE* value of 2.46. The row ΔE* 16/24 in the table above indicates the change in ΔE* between the sample that was heat treated for 16 minutes and the sample that was heat treated for 24 minutes. Thus, regarding glass side reflective ΔE* values for example, for the CE ΔE* changed 2.46 during the first 16 minutes of HT, but then changed an additional 2.11 for the further HT period from the 16 minute mark to the 24 minutes mark. However, for Example 2, regarding glass side reflective ΔE* values for example, ΔE* changed 1.81 during the first 16 minutes of HT, but then changed only an additional 1.21 for the further HT period from the 16 minute mark to the 24 minutes mark. The transmissive ΔE* 16/24 value of Ex. 2 (0.69) is also significantly better (lower) than that of the CE, which again is advantageous as explained above. Therefore, it will be appreciated that the glass side reflective color values stabilized more for Example 2 than for the CE. This improvement of thermal stability widens the process window of the tempering process as explained above, and makes it easier to achieve the final product or essentially the final product color even though in real world applications the heat treating may occur for different periods of time as explained above based on different glass thicknesses and/or different types of tempering furnaces.

In certain embodiments of this invention there is provided a coated article including a coating supported by a glass substrate, comprising: a first dielectric layer supported by the glass substrate; a first infrared (IR) reflecting layer comprising silver supported by the glass substrate and located over at least the first dielectric layer; an upper contact layer (e.g,. comprising an oxide of Ni and/or Cr, or Ti, or an oxide of Ti), the upper contact layer located over and directly contacting the first IR reflecting layer comprising silver; a layer comprising zinc stannate located over and directly contacting the upper contact layer; a first layer comprising silicon nitride located over and directly contacting the layer comprising zinc stannate; a second IR reflecting layer comprising silver located over at least the first layer comprising silicon nitride; and another dielectric layer located over at least the second IR reflecting layer.

The coated article of the immediately preceding paragraph may further comprise a layer comprising zinc oxide located under and directly contacting the second IR reflecting layer comprising silver.

In the coated article of any of the preceding two paragraphs, the upper contact layer may comprise an oxide of NiCr.

In the coated article of any of the preceding three paragraphs, the first dielectric layer may comprise silicon nitride.

In the coated article of any of the preceding four paragraphs, there may be another dielectric layer that comprises tin oxide.

In the coated article of any of the preceding five paragraphs, there may be a layer comprising NiCr that is located between and directly contacting the first layer comprising silicon nitride and a further layer comprising silicon nitride.

The coated article of any of the preceding six paragraphs may further comprise a layer comprising zinc oxide located under and directly contacting the first IR reflecting layer comprising silver.

It is possible that the coated article of any of the preceding seven paragraphs may have no more than two IR reflecting layers comprising silver.

In the coated article of any of the preceding eight paragraphs, the layer comprising zinc stannate may contain more Zn than Sn.

In the coated article of any of the preceding nine paragraphs, the layer comprising zinc stannate, with respect to metal content, may contain from 51-90% Zn and from 10-49% Sn (wt. %).

In the coated article of any of the preceding ten paragraphs, the layer comprising zinc stannate may be substantially fully oxided.

In the coated article of any of the preceding eleven paragraphs, the layer comprising zinc stannate may consist of or consist essentially of zinc stannate.

In the coated article of any of the preceding twelve paragraphs, the coating may have a sheet resistance ($R_s$) of no greater than 3.0 ohms/square.

In the coated article of any of the preceding thirteen paragraphs, the coated article, measured monolithically, may have a visible transmission of at least about 40%.

In the coated article of any of the preceding fourteen paragraphs, the coated article may be heat treated.

In the coated article of any of the preceding fifteen paragraphs, the layer comprising zinc stannate may be the thickest layer in the coating.

In the coated article of any of the preceding sixteen paragraphs, the layer comprising zinc stannate may be at least five times thicker than is the upper contact layer.

In the coated article of any of the preceding seventeen paragraphs, the layer comprising zinc stannate may be at least twice as thick as the layer comprising silicon nitride that is located over and directly contacting the layer comprising zinc stannate.

In the coated article of any of the preceding eighteen paragraphs, the second IR reflecting layer comprising silver may be at least 40 angstroms thicker than is the first IR reflecting layer comprising silver.

In the coated article of any of the preceding nineteen paragraphs, the layer comprising zinc stannate may be from 350-600 angstroms thick.

The coated article of any of the preceding twenty paragraphs may further comprise a third IR reflecting layer comprising silver that is located over at least the another dielectric layer.

In the coated article of any of the preceding twenty-one paragraphs, layers of the coating may be of materials and thicknesses so that the coated article will have a transmissive and/or glass side reflective $\Delta E^*$ value(s) of no greater than 5.0 upon heat treatment at about 650 degrees C. for all time periods between 0 and 30 minutes.

In the coated article of any of the preceding twenty-two paragraphs, layers of the coating may be of materials and thicknesses so that the coated article will have a glass side reflective and/or transmissive $\Delta E^*$ value of no greater than 4.0 upon heat treatment at about 650 degrees C. for all time periods between 0 and 24 minutes.

In the coated article of any of the preceding twenty-three paragraphs, layers of the coating may be of materials and thicknesses so that the coated article will have a haze % of no greater than 0.60% upon heat treatment at about 650 degrees C. for all time periods between 0 and 30 minutes.

In the coated article of any of the preceding twenty-four paragraphs, the layers of the coating may be of materials and thicknesses so that visible transmission of the coated article substantially plateaus and thus does not change by more than 1.0% between heat treating times of from 12-24 minutes at a heat treating temperature of about 650 degrees C.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, comprising:
a first dielectric layer supported by the glass substrate;
a second dielectric layer supported by the glass substrate and located over the first dielectric layer;
a first infrared (IR) reflecting layer comprising silver supported by the glass substrate and located over at least the first and second dielectric layers;
a first upper contact layer comprising an oxide of NiCr from 20-40 Å thick, the first upper contact layer located over and directly contacting the first IR reflecting layer comprising silver;
a layer comprising zinc stannate from 350-600 Å thick located over and directly contacting the first upper contact layer comprising the oxide of NiCr in order to improve color stability upon heat treatment;

a first layer comprising silicon nitride from 80-200 Å thick located over and directly contacting the layer comprising zinc stannate;
a layer comprising zinc oxide supported by the glass substrate and located over at least the first layer comprising silicon nitride;
a second IR reflecting layer comprising silver located over at least the first layer comprising silicon nitride and the layer comprising zinc oxide, wherein the coating contains no more than two IR reflecting layers comprising silver;
a second upper contact layer located over and directly contacting the second IR reflecting layer comprising silver;
another dielectric layer located over at least the second IR reflecting layer and the second upper contact layer; and
wherein layers of the coating are of materials and thicknesses configured so that the coated article will have a transmissive ΔE* value of no greater than 5.0 upon heat treatment at about 650 degrees C. for all time periods between 0 and 30 minutes.

2. The coated article of claim 1, wherein the first dielectric layer comprises silicon nitride.

3. The coated article of claim 1, wherein the another dielectric layer comprises tin oxide.

4. The coated article of claim 1, further comprising a layer comprising NiCr that is located between and directly contacting the first layer comprising silicon nitride and a further layer comprising silicon nitride.

5. The coated article of claim 1, wherein the second dielectric layer comprises zinc oxide and is located under and directly contacting the first IR reflecting layer comprising silver.

6. The coated article of claim 1, wherein the layer comprising zinc stannate contains more Zn than Sn.

7. The coated article of claim 1, wherein the layer comprising zinc stannate, with respect to metal content, contains from 51-90% Zn and from 10-49% Sn (wt. %).

8. The coated article of claim 1, wherein the layer comprising zinc stannate is substantially fully oxided.

9. The coated article of claim 1, wherein the layer comprising zinc stannate consists essentially of zinc stannate.

10. The coated article of claim 1, wherein the coating has a sheet resistance ($R_s$) of no greater than 3.0 ohms/square.

11. The coated article of claim 1, wherein the coated article, measured monolithically, has a visible transmission of at least about 40%.

12. The coated article of claim 1, wherein the coated article is heat treated.

13. he coated article of claim 1, wherein the layer comprising zinc stannate is the thickest layer in the coating.

14. The coated article of claim 1, wherein the layer comprising zinc stannate is at least five times thicker than is the upper contact layer comprising the oxide of NiCr.

15. The coated article of claim 1, wherein the layer comprising zinc stannate is at least twice as thick as the first layer comprising silicon nitride that is located over and directly contacting the layer comprising zinc stannate.

16. The coated article of claim 1, wherein the second IR reflecting layer comprising silver is at least 40 angstroms thicker than is the first IR reflecting layer comprising silver.

17. The coated article of claim 1, wherein layers of the coating are of materials and thicknesses so that the coated article will have a glass side reflective ΔE* value of no greater than 5.0 upon heat treatment at about 650 degrees C. for all time periods between 0 and 30 minutes.

18. The coated article of claim 1, wherein layers of the coating are of materials and thicknesses so that the coated article will have a glass side reflective ΔE* value of no greater than 4.0 upon heat treatment at about 650 degrees C. for all time periods between 0 and 24 minutes.

19. The coated article of claim 1, wherein layers of the coating are of materials and thicknesses so that the coated article will have a transmissive ΔE* value of no greater than 4.0 upon heat treatment at about 650 degrees C. for all time periods between 0 and 24 minutes.

20. The coated article of claim 1, wherein layers of the coating are of materials and thicknesses so that the coated article will have a haze % of no greater than 0.60% upon heat treatment at about 650 degrees C. for all time periods between 0 and 30 minutes.

21. The coated article of claim 1, wherein the layers of the coating are of materials and thicknesses so that visible transmission of the coated article substantially plateaus and thus does not change by more than 1.0% between heat treating times of from 12-24 minutes at a heat treating temperature of about 650 degrees C.

22. The coated article of claim 1, further comprising a layer comprising an oxide of NiCr located over and directly contacting the first layer comprising silicon nitride, and a second layer comprising silicon nitride located over and directly contacting the layer comprising the oxide of NiCr.

23. The coated article of claim 1, further comprising a layer comprising NiCr located over and directly contacting the first layer comprising silicon nitride, and a second layer comprising silicon nitride located over and directly contacting the layer comprising NiCr.

24. The coated article of claim 23, wherein the layer comprising zinc oxide is located between and directly contacting the second layer comprising silicon nitride and the second IR reflecting layer.

25. The coated article of claim 1, further comprising an absorber layer located over and directly contacting the first layer comprising silicon nitride, and a second layer comprising silicon nitride located over and directly contacting the absorber layer.

26. The coated article of claim 25, wherein the layer comprising zinc oxide is located between and directly contacting the second layer comprising silicon nitride and the second IR reflecting layer.

27. A coated article including a coating supported by a glass substrate, comprising:
a first dielectric layer supported by the glass substrate;
a second dielectric layer supported by the glass substrate and located over the first dielectric layer;
a first infrared (IR) reflecting layer comprising silver supported by the glass substrate and located over at least the first dielectric layer;
an upper contact layer comprising an oxide of NiCr from 20-40 Å thick, the upper contact layer comprising an oxide of NiCr located over and directly contacting the first IR reflecting layer comprising silver;
a layer comprising zinc stannate from 350-600 Å thick located over and directly contacting the upper contact layer comprising an oxide of NiCr in order to improve color stability upon heat treatment;
a first layer comprising silicon nitride from 80-200 Å thick located over and directly contacting the layer comprising zinc stannate;
a layer comprising zinc oxide supported by the glass substrate and located over at least the first layer comprising silicon nitride;

a second IR reflecting layer comprising silver located over at least the first layer comprising silicon nitride and located over and directly contacting the layer comprising zinc oxide, wherein the coating contains no more than two IR reflecting layers comprising silver;

another dielectric layer located over at least the second IR reflecting layer; and wherein layers of the coating are of materials and thicknesses configured so that the coated article will have a transmissive $\Delta E^*$ value of no greater than 5.0 upon heat treatment at about 650 degrees C. for all time periods between 0 and 30 minutes.

* * * * *